(12) United States Patent
Lee et al.

(10) Patent No.: US 12,492,444 B2
(45) Date of Patent: *Dec. 9, 2025

(54) HIGH STRENGTH STEEL SHEET HAVING SUPERIOR WORKABILITY AND METHOD FOR MANUFACTURING SAME

(71) Applicant: POSCO, Pohang-si (KR)

(72) Inventors: Jae-Hoon Lee, Gwangyang-si (KR); Tae-Kyo Han, Gwangyang-si (KR); Sang-Hwan Lee, Incheon (KR)

(73) Assignee: POSCO, Pohang-si (KR)

( * ) Notice: Subject to any disclaimer, the term of this patent is extended or adjusted under 35 U.S.C. 154(b) by 684 days.

This patent is subject to a terminal disclaimer.

(21) Appl. No.: 17/786,426

(22) PCT Filed: Nov. 24, 2020

(86) PCT No.: PCT/KR2020/016656
§ 371 (c)(1),
(2) Date: Jun. 16, 2022

(87) PCT Pub. No.: WO2021/125597
PCT Pub. Date: Jun. 24, 2021

(65) Prior Publication Data
US 2023/0029040 A1 Jan. 26, 2023

(30) Foreign Application Priority Data
Dec. 18, 2019 (KR) .................. 10-2019-0169641

(51) Int. Cl.
| | | |
|---|---|---|
| C21D 9/46 | (2006.01) | |
| C21D 6/00 | (2006.01) | |
| C21D 8/02 | (2006.01) | |
| C22C 38/00 | (2006.01) | |
| C22C 38/06 | (2006.01) | |
| C22C 38/08 | (2006.01) | |
| C22C 38/10 | (2006.01) | |
| C22C 38/14 | (2006.01) | |
| C22C 38/16 | (2006.01) | |
| C22C 38/22 | (2006.01) | |
| C22C 38/34 | (2006.01) | |
| C22C 38/38 | (2006.01) | |

(52) U.S. Cl.
CPC .............. *C21D 9/46* (2013.01); *C21D 6/001* (2013.01); *C21D 6/002* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01); *C22C 38/005* (2013.01); *C22C 38/008* (2013.01); *C22C 38/06* (2013.01); *C22C 38/08* (2013.01); *C22C 38/10* (2013.01); *C22C 38/14* (2013.01); *C22C 38/16* (2013.01); *C22C 38/22* (2013.01); *C22C 38/34* (2013.01); *C22C 38/38* (2013.01); *C21D 2211/001* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | |
|---|---|---|
| 2007/0190353 A1 | 8/2007 | Taniguchi et al. |
| 2010/0104891 A1 | 4/2010 | Nakagaito et al. |
| 2011/0146852 A1 | 6/2011 | Matsuda et al. |
| 2013/0167980 A1 | 7/2013 | Kawata et al. |
| 2014/0170439 A1 | 6/2014 | Allain et al. |
| 2017/0096723 A1 | 4/2017 | Kasuya et al. |
| 2018/0044752 A1 | 2/2018 | Murata et al. |
| 2018/0298462 A1 | 10/2018 | Sano et al. |
| 2019/0003009 A1 | 1/2019 | Kawata et al. |
| 2019/0071757 A1 | 3/2019 | Murata et al. |
| 2019/0218652 A1 | 7/2019 | Haga et al. |
| 2019/0256945 A1 | 8/2019 | Zhou et al. |
| 2020/0040420 A1 | 2/2020 | Minami et al. |
| 2020/0392598 A1 | 12/2020 | Tanaka et al. |
| 2020/0392610 A1 | 12/2020 | Tanaka et al. |
| 2021/0115528 A1 | 4/2021 | Magar et al. |

FOREIGN PATENT DOCUMENTS

| | | |
|---|---|---|
| CN | 110073020 | 7/2019 |
| EP | 2617849 A1 | 7/2013 |
| EP | 3279363 A1 | 2/2018 |
| EP | 3438309 A1 | 2/2019 |
| EP | 3561101 | 10/2019 |
| JP | 2008266778 | 11/2008 |
| JP | 2009019258 | 1/2009 |
| JP | 2015105383 A | 6/2015 |
| JP | 2016008310 A | 1/2016 |
| JP | 2017053001 | 3/2017 |

(Continued)

OTHER PUBLICATIONS

International Search Report—PCT/KR2020/016656 dated Feb. 24, 2021.
Chinese Office Action—Chinese Application No. 202080087111.4 issued on Feb. 8, 2023, citing KR 10-2013-0032917, CN 110073020, JP 2008-266778, KR 10-2014-0127570, KR 10-2018-0061395, and WO 2018/115935.
European Search Report—European Application No. 20902609.5 issued on Jul. 3, 2023, citing EP 2617849, EP 3438309, and EP 3279363.

(Continued)

*Primary Examiner* — Anthony M Liang
(74) *Attorney, Agent, or Firm* — CANTOR COLBURN LLP

(57) ABSTRACT

Provided is a steel sheet which can be used for automobile parts and the like, and relates to a steel sheet having a superior balance of strength and ductility and strength and hole expansion ratio and superior bending formability, and a method for manufacturing same.

5 Claims, No Drawings

(56) References Cited

FOREIGN PATENT DOCUMENTS

| | | |
|---|---|---|
| JP | 2017186647 A | 10/2017 |
| JP | 2018162495 A | 10/2018 |
| KR | 20060118602 | 11/2006 |
| KR | 20130032917 | 4/2013 |
| KR | 101340758 | 12/2013 |
| KR | 20140012167 | 1/2014 |
| KR | 20140127570 | 11/2014 |
| KR | 20180016518 | 2/2018 |
| KR | 20180061395 | 6/2018 |
| KR | 20180088707 | 8/2018 |
| KR | 20180125560 | 11/2018 |
| KR | 20190039424 | 4/2019 |
| KR | 20190040018 | 4/2019 |
| KR | 20190071755 | 6/2019 |
| KR | 20190107089 A | 9/2019 |
| WO | 2018115935 | 6/2018 |
| WO | 2019131188 A1 | 7/2019 |
| WO | 2019131189 A1 | 7/2019 |

OTHER PUBLICATIONS

Japanese Office Action—Japanese Application No. 2022-536958 issued on Sep. 5, 2023, citing JP 2015-105383, JP 2018-162495, JP 2017-186647, JP 2016-008310, WO 2019/131188, and WO 2019/131189.

Chinese Office Action - Chinese Application No. 202080087111.4 issued on Apr. 18, 2024, citing KR 10-2018-0125560 and KR 10-2019-0107089.

HIGH STRENGTH STEEL SHEET HAVING SUPERIOR WORKABILITY AND METHOD FOR MANUFACTURING SAME

TECHNICAL FIELD

The present invention relates to a steel sheet that may be used for automobile parts and the like, and to a steel sheet having high strength characteristics and superior workability and a method for manufacturing same.

BACKGROUND ART

In recent years, the automobile industry is paying attention to ways to reduce material weight and secure occupant stability in order to protect the global environment. In order to meet these requirements for stability and weight reduction, the application of a high strength steel sheet is rapidly increasing. In general, it has been known that as the strength of the steel sheet increases, the workability of the steel sheet decreases. Therefore, in the steel sheet for automobile parts, a steel sheet having superior workability represented by ductility, bending formability, and hole expandability while having high strength characteristics is required.

As a technique for improving workability of a steel sheet, a method of utilizing tempered martensite is disclosed in Patent Documents 1 and 2. Since the tempered martensite made by tempering hard martensite is softened martensite, there is a difference in strength between the tempered martensite and the existing untempered martensite (fresh martensite). Therefore, when fresh martensite is suppressed and the tempered martensite is formed, the workability may be increased.

However, by the techniques disclosed in Patent Documents 1 and 2, a balance (TSXEl) of tensile strength and elongation does not satisfy 22,000 MPa % or more, which means that it is difficult to secure a steel sheet having superior strength and ductility.

Meanwhile, transformation induced plasticity (TRIP) steel using transformation-induced plasticity of retained austenite was developed in order to obtain both high strength and superior workability for automobile member steel sheets. Patent Document 3 discloses TRIP steel having superior strength and workability.

Patent Document 3 discloses improving high ductility and workability by including polygonal ferrite, retained austenite, and martensite, but it can be seen that Patent Document 3 uses bainite as a main phase, and thus, the high strength is not secured and the balance (TSXEl) of tensile strength and elongation also does not satisfy 22,000 MPa % or more.

That is, the demand for a steel sheet having superior workability, such as ductility, bending formability, and hole expansion ratio while having high strength, is not satisfied.

RELATED ART DOCUMENT (Patent Document 1) Korean Patent Laid-Open Publication No. 10-2006-0118602

(Patent Document 2) Japanese Patent Laid-Open Publication No. 2009-019258

(Patent Document 3) Korean Patent Laid-Open Publication No. 10-2014-0012167

DISCLOSURE

Technical Problem

The present invention provides a high strength steel sheet having superior ductility, bending formability, and hole expansion ratio by optimizing a composition and microstructure of the steel sheet and a method for manufacturing the same.

An object of the present invention is not limited to the abovementioned contents. Additional problems of the present invention are described in the overall content of the specification, and those of ordinary skill in the art to which the present invention pertains will have no difficulty in understanding the additional problems of the present invention from the contents described in the specification of the present invention.

Technical Solution

According to an aspect of the present invention, a high strength steel sheet having superior workability according may include: by wt %, C: 0.25 to 0.75%, Si: 4.0% or less, Mn: 0.9 to 5.0%, Al: 5.0% or less, P: 0.15% or less, S: 0.03% or less, N: 0.03% or less, a balance of Fe, and unavoidable impurities, and include, as microstructures, ferrite which is a soft structure, and tempered martensite, bainite, and retained austenite which are hard structures, and may satisfy the following [Relational Expression 1] and [Relational Expression 2].

$$0.4 \leq [H]_F / [H]_F / [H]_{TM+B+\gamma} \leq 0.9 \quad \text{[Relational Expression 1]}$$

where $[H]_F$ and $[H]T_{M+B+\gamma}$ are nanohardness values measured using a nanoindenter, $[H]_F$ is an average nanohardness value Hv of the ferrite which is the soft structure, $[H]_{TM+B+\gamma}$ is the average nanohardness value Hv of the tempered martensite, the bainite, and the retained austenite which are the hard structures.

$$T(\gamma)/V(\gamma) \geq 0.1 \quad \text{[Relational Expression 2]}$$

where $T(\gamma)$ is a fraction (vol %) of the tempered retained austenite of the steel sheet, and $V(\gamma)$ is a fraction (vol %) of the retained austenite of the steel sheet.

The steel sheet may further include any one or more of the following (1) to (9):

(1) one or more of Ti: 0 to 0.5%, Nb: 0 to 0.5%, and V: 0 to 0.5%;
(2) one or more of Cr: 0 to 3.0% and Mo: 0 to 3.0%;
(3) one or more of Cu: 0 to 4.5% and Ni: 0 to 4.5%;
(4) B 0 to 0.005%;
(5) one or more of Ca: 0 to 0.05%, REM: 0 to 0.05% excluding Y, and Mg: 0 to 0.05%;
(6) one or more of W: 0 to 0.5% and Zr: 0 to 0.5%;
(7) one or more of Sb: 0 to 0.5% and Sn: 0 to 0.5%;
(8) one or more of Y: 0 to 0.2% and Hf: 0 to 0.2%; and
(9) Co: 0 to 1.5%.

A total content (Si+Al) of Si and Al may be 1.0 to 6.0 wt %.

The microstructure of the steel sheet may include 30 to 70 vol % of tempered martensite, 10 to 45 vol % of bainite, 10 to 40 vol % of retained austenite, and 3 to 20 vol % of ferrite.

A balance $B_{T-E}$ of tensile strength and elongation expressed by the following [Relational Expression 3] may be 22,000 (MPa %) or more, a balance $B_{T-H}$ of tensile strength and hole expansion ratio expressed by the following [Relational Expression 4] may be $7*10^6$ (MPa²%$^{1/2}$) or more, and bendability $B_R$ expressed by the following [Relational Expression 5] may satisfy 0.5 to 3.0.

$$B_{T \cdot E} = [\text{Tensile Strength(TS,MPa)}] * [\text{Elongation (El, \%)}] \quad \text{[Relational Expression 3]}$$

$$B_{T \cdot H} = [\text{Tensile Strength(TS,MPa)}]^2 * [\text{Hole Expansion Ratio(HER,\%)}]^{1/2} \quad \text{[Relational Expression 4]}$$

$$B_R = R/t \quad \text{[Relational Expression 5]}$$

where R means a minimum bending radius (mm) at which cracks do not occur after a 90° bending test, and t means a thickness (mm) of the steel sheet.

According to an aspect of the present invention, a method for manufacturing a high strength steel sheet having superior workability may include: providing a cold-rolled steel sheet including, by wt %, C: 0.25 to 0.75%, Si: 4.0% or less, Mn: 0.9 to 5.0%, Al: 5.0% or less, P: 0.15% or less, S: 0.03% or less, N: 0.03% or less, a balance of Fe, and unavoidable impurities; heating (primarily heating) the cold-rolled steel sheet to a temperature within a range of Ac1 or higher and less than Ac3, and maintaining (primarily maintaining) the primarily heated steel sheet for 50 seconds or more; cooling (primarily cooling) the primarily heated steel sheet to a temperature within a range (primarily cooling stop temperature) of 600 to 850° C. at an average cooling rate of 1° C./s or more; cooling (secondarily cooling) the primarily cooled steel sheet to a temperature within a range of 300 to 500° C. at an average cooling rate of 2° C./s or more, and maintaining (secondarily maintaining) the secondarily cooled steel sheet in the temperature within a range for 5 seconds or more; cooling (tertiarily cooling) the secondarily cooled steel sheet to a temperature within a range (secondarily cooling stop temperature) of 100 to 300° C. at an average cooling rate of 2° C./s or more; heating (secondarily heating) the tertiarily cooled steel sheet to a temperature within a range of 300 to 500° C. at an average temperature increase rate of 5° C./s, and maintaining (tertiarily maintaining) the secondarily heated steel sheet in the temperature within a range for 50 seconds or more; and cooling (quaternarily cooling) the secondarily heated steel sheet to room temperature.

The cold-rolled steel sheet may further include any one or more of the following (1) to (9):

(1) one or more of Ti: 0 to 0.5%, Nb: 0 to 0.5%, and V: 0 to 0.5%;
(2) one or more of Cr: 0 to 3.0% and Mo: 0 to 3.0%;
(3) one or more of Cu: 0 to 4.5% and Ni: 0 to 4.5%;
(4) B: 0 to 0.005%;
(5) one or more of Ca: 0 to 0.05%, REM: 0 to 0.05% excluding Y, and Mg: 0 to 0.05%;
(6) one or more of W: 0 to 0.5% and Zr: 0 to 0.5%;
(7) one or more of Sb: 0 to 0.5% and Sn: 0 to 0.5%;
(8) one or more of Y: 0 to 0.2% and Hf: 0 to 0.2%; and
(9) Co 0 to 1.5%.

A total content (Si+Al) of Si and Al included in the cold-rolled steel sheet may be 1.0 to 6.0 wt %.

The providing of the cold-rolled steel sheet may include heating a steel slab to 1000 to 1350° C.; performing finishing hot rolling in a temperature within a range of 800 to 1000° C.; coiling the hot-rolled steel sheet in a temperature within a range of 300 to 600° C.; performing hot-rolled annealing heat treatment on the coiled steel sheet in a temperature within a range of 650 to 850° C. for 600 to 1700 seconds; and cold rolling the hot-rolled annealing heat-treated steel sheet at a reduction ratio of 30 to 90%.

A cooling rate Vc1 of the primary cooling and a cooling rate Vc2 of the secondary cooling may satisfy a relationship of Vc1<Vc2.

Advantageous Effects

According to an aspect of the present disclosure, it is possible to provide a steel sheet particularly suitable for automobile parts because the steel sheet has superior strength as well as superior workability such as ductility, bending formability, and hole expansion ratio.

BEST MODE

The present invention relates to a high strength steel sheet having superior workability and a method for manufacturing the same, and exemplary embodiments in the present invention will hereinafter be described. Exemplary embodiments in the present invention may be modified into several forms, and it is not to be interpreted that the scope of the present invention is limited to exemplary embodiments described below. The present exemplary embodiments are provided in order to further describe the present invention in detail to those skilled in the art to which the present invention pertains.

The inventors of the present invention recognized that, in a transformation induced plasticity (TRIP) steel including bainite, tempered martensite, retained austenite, and ferrite, when controlling a ratio of specific components included in the retained austenite and the ferrite to a certain range while promoting stabilization of the retained austenite, it is possible to simultaneously secure workability and strength of a steel sheet by reducing an inter-phase hardness difference of the retained austenite and the ferrite. Based on this, the present inventors have reached the present invention by devising a method capable of improving ductility and workability of the high strength steel sheet.

Hereinafter, a high strength steel sheet having superior workability according to an aspect of the present invention will be described in more detail.

According to an aspect of the present invention, a high strength steel sheet having superior workability according may include: by wt %, C: 0.25 to 0.75%, Si: 4.0% or less, Mn: 0.9 to 5.0%, Al: 5.0% or less, P: 0.15% or less, S: 0.03% or less, N: 0.03% or less, a balance of Fe, and unavoidable impurities, and includes, as microstructures, ferrite which is a soft structure, and tempered martensite, bainite, and retained austenite which are hard structures, and may satisfy the following [Relational Expression 1] and [Relational Expression 2].

$$0.4 \leq [H]_F/[H]_{TM+B+\gamma} \leq 0.9 \quad \text{[Relational Expression 1]}$$

where $[H]_F$ and $[H]T_{M+B+\gamma}$ are nanohardness values measured using a nanoindenter, $[H]_F$ is an average nanohardness value Hv of the ferrite which is the soft structure, $[H]_{TM+B+\gamma}$ is the average nanohardness value Hv of the tempered martensite, the bainite, and the retained austenite which are the hard structures.

$$T(\gamma)/V(\gamma) \geq 0.1 \quad \text{[Relational Expression 2]}$$

where $T(\gamma)$ is a fraction (vol %) of the tempered retained austenite of the steel sheet, and $V(\gamma)$ is a fraction (vol %) of the retained austenite of the steel sheet.

Hereinafter, compositions of steel according to the present invention will be described in more detail. Hereinafter, unless otherwise indicated, % indicating a content of each element is based on weight.

The high strength steel sheet having superior workability according to an aspect of the present invention includes, by weight, C: 0.25 to 0.75%, Si: 4.0% or less, Mn: 0.9 to 5.0%, Al: 5.0% or less, P: 0.15% or less, S: 0.03% or less, N: 0.03% or less, a balance of Fe, and unavoidable impurities. In addition, the high strength steel sheet may further include one or more of Ti: 0.5% or less (including 0%), Nb: 0.5% or less (including 0%), V: 0.5% or less (including 0%), Cr:

3.0% or less (including 0%), Mo: 3.0% or less (including 0%), Cu: 4.5% or less (including 0%), Ni: 4.5% or less (including 0%), B: 0.005% or less (including 0%), Ca: 0.05% or less (including 0%), REM: 0.05% or less (including 0%) excluding Y, Mg: 0.05% or less (including 0%), W: 0.5% or less (including 0%), Zr: 0.5% or less (including 0%), Sb: 0.5% or less (including 0%), Sn: 0.5% or less (including 0%), Y: 0.2% or less (including 0%), Hf: 0.2% or less (including 0%), Co: 1.5% or less (including 0%). In addition, a total content (Si+Al) of Si and Al may be 1.0 to 6.0%.

Carbon (C): 0.25 to 0.75%

Carbon (C) is an unavoidable element for securing strength of a steel sheet, and is also an element for stabilizing the retained austenite that contributes to the improvement in ductility of the steel sheet. Accordingly, the present invention may include 0.25% or more of carbon (C) to achieve such an effect. A preferable content of carbon (C) may exceed 0.25%, may be 0.27% or more, and may be 0.30% or more. The more preferable content of carbon (C) may be 0.31% or more. On the other hand, when the content of carbon (C) exceeds a certain level, cold rolling may become difficult due to an excessive increase in strength. Therefore, an upper limit of the content of carbon (C) of the present disclosure may be limited to 0.75%. The content of carbon (C) may be 0.70% or less, and the more preferable content of carbon (C) may be 0.67% or less.

Silicon (Si): 4.0% or less (excluding 0%)

Silicon (Si) is an element that contributes to improvement in strength by solid solution strengthening, and is also an element that improves workability by strengthening ferrite and homogenizing a structure. In addition, silicon (Si) is an element contributing to a generation of the retained austenite by suppressing precipitation of cementite. Therefore, in the present invention, silicon (Si) may be necessarily added to achieve such an effect. The preferable content of silicon (Si) may be 0.02% or more, and the more preferable content of silicon (Si) may be 0.05% or more. However, when the content of silicon (Si) exceeds a certain level, a problem of plating defects, such as non-plating, may be induced during plating, and weldability of a steel sheet may be lowered, so the present invention may limit the upper limit of the silicon (Si) content to 4.0%. The preferable upper limit of the content of silicon (Si) may be 3.8%, and the more preferable upper limit of the content of silicon (Si) may be 3.5%.

Aluminum (Al): 5.0% or less (excluding 0%)

Aluminum (Al) is an element that performs deoxidation by combining with oxygen in steel. In addition, aluminum (Al) is also an element for stabilizing the retained austenite by suppressing precipitation of cementite like silicon (Si). Therefore, in the present invention, aluminum (Al) may be necessarily added to achieve such an effect. A preferable content of aluminum (Al) may be 0.05% or more, and a more preferable content of aluminum (Al) may be 0.1% or more. On the other hand, when aluminum (Al) is excessively added, inclusions in a steel sheet increase, and the workability of the steel sheet may be lowered, so the present invention may limit the upper limit of the content of aluminum (Al) to 5.0%. The preferable upper limit of the content of aluminum (Al) may be 4.75%, and the more preferable upper limit of the content of aluminum (Al) may be 4.5%.

Meanwhile, the total content (Si+Al) of silicon (Si) and aluminum (Al) is preferably 1.0 to 6.0%. Since silicon (Si) and aluminum (Al) are components that affect microstructure formation in the present invention, and thus, affect ductility, bending formability, and hole expansion ratio, the total content of silicon (Si) and aluminum (Al) is preferably 1.0 to 6.0%. The more preferable total content (Si+Al) of silicon (Si) and aluminum (Al) may be 1.5% or more, and may be 4.0% or less.

Manganese (Mn): 0.9 to 5.0%

Manganese (Mn) is a useful element for increasing both strength and ductility. Therefore, in the present disclosure, a lower limit of a content of manganese (Mn) may be limited to 0.9% in order to achieve such an effect. A preferable lower limit of the content of manganese (Mn) may be 1.0%, and a more preferable lower limit of the content of manganese (Mn) may be 1.1%. On the other hand, when manganese (Mn) is excessively added, the bainite transformation time increases and a concentration of carbon (C) in the austenite becomes insufficient, so there is a problem in that the desired austenite fraction may not be secured. Therefore, an upper limit of the content of manganese (Mn) of the present disclosure may be limited to 5.0%. A preferable upper limit of the content of manganese (Mn) may be 4.7%, and a more preferable upper limit of the content of manganese (Mn) may be 4.5%.

Phosphorus (Ni): 0.15% or less (including 0%)

Phosphorus (P) is an element that is included as an impurity and deteriorates impact toughness. Therefore, it is preferable to manage the content of phosphorus (P) to 0.15% or less.

Sulfur (S): 0.03% or less (including 0%)

Sulfur (S) is an element that is included as an impurity to form MnS in a steel sheet and deteriorate ductility. Therefore, the content of sulfur (S) is preferably 0.03% or less.

Nitrogen (S): 0.03% or less (including 0%)

Nitrogen (N) is an element that is contained as an impurity and forms nitride during continuous casting to causes cracks of slab. Therefore, the content of nitrogen (N) is preferably 0.03% or less.

Meanwhile, the steel sheet of the present invention has an alloy composition that may be additionally included in addition to the above-described alloy components, which will be described in detail below.

One or more of titanium (Ti): 0 to 0.5%, niobium (Nb): 0 to 0.5%, and vanadium (V): 0 to 0.5%

Titanium (Ti), niobium (Nb), and vanadium (V) are elements that make precipitates and refine crystal grains, and are elements that also contribute to the improvement in strength and impact toughness of a steel sheet, and therefore, in the present invention, one or more of titanium (Ti), niobium (Nb), and vanadium (V) may be added to achieve such an effect. However, when the content of titanium (Ti), niobium (Nb), and vanadium (V) exceed a certain level, respectively, excessive precipitates are formed to lower impact toughness and increase manufacturing cost, so the present invention may limit the content of titanium (Ti), niobium (Nb), and vanadium (V) to 0.5% or less, respectively.

One or more of chromium (Cr): 0 to 3.0% and molybdenum (Mo): 0 to 3.0%

Since chromium (Cr) and molybdenum (Mo) are elements that not only suppress austenite decomposition during alloying treatment, but also stabilize austenite like manganese (Mn), the present invention may add one or more of chromium (Cr) and molybdenum (Mo) to achieve such an effect. However, when the content of chromium (Cr) and molybdenum (Mo) exceeds a certain level, the bainite transformation time increases and the concentration of carbon (C) in austenite becomes insufficient, so the desired retained austenite fraction may not be secured. Therefore, the present invention may limit the content of chromium (Cr) and molybdenum (Mo) to 3.0% or less, respectively.

One or more of Cu: 0 to 4.5% and Ni: 0 to 4.5%

Copper (Cu) and nickel (Ni) are elements that stabilize austenite and suppress corrosion. In addition, copper (Cu) and nickel (Ni) are also elements that are concentrated on a surface of a steel sheet to prevent hydrogen from intruding into the steel sheet, to thereby suppress hydrogen delayed destruction. Accordingly, in the present invention, one or more of copper (Cu) and nickel (Ni) may be added to achieve such an effect. However, when the content of copper (Cu) and nickel (Ni) exceeds a certain level, not only excessive characteristic effects, but also an increase in manufacturing cost is induced, so the present invention may limit the content of copper (Cu) and nickel (Ni) to 4.5% or less, respectively.

Boron (B): 0 to 0.005%

Boron (B) is an element that improves hardenability to increase strength, and is also an element that suppresses nucleation of grain boundaries. Therefore, in the present invention, boron (B) may be added to achieve such an effect. However, when the content of boron (B) exceeds a certain level, not only excessive characteristic effects, but also an increases in manufacturing cost is induced, so the present invention may limit the content of boron (B) to 0.005% or less.

One or more of calcium (Ca): 0 to 0.05%, Magnesium (Mg): 0 to 0.05%, and rare earth element (REM) excluding yttrium (Y): 0 to 0.05%

Here, the rare earth element (REM) means scandium (Sc), yttrium (Y), and a lanthanide element. Since calcium (Ca), magnesium (Mg), and the rare earth element (REM) excluding yttrium (Y) are elements that contribute to the improvement in ductility of a steel sheet by spheroidizing sulfides, in the present invention, one or more of calcium (Ca), magnesium (Mg), and the rare earth element (REM) excluding yttrium (Y) may be added to achieve such an effect. However, when the content of calcium (Ca), magnesium (Mg), and the rare earth element (REM) excluding yttrium (Y) exceeds a certain level, not only excessive characteristic effects, but also an increase in manufacturing cost are induced, so the present invention may limit the content of calcium (Ca), magnesium (Mg), and the rare earth element (REM) excluding yttrium (Y) to 0.05% or less, respectively.

One or more of tungsten (W): 0 to 0.5% and zirconium (Zr): 0 to 0.5%

Since tungsten (W) and zirconium (Zr) are elements that increase strength of a steel sheet by improving hardenability, in the present invention, one or more of tungsten (W) and zirconium (Zr) may be added to achieve such an effect. However, when the content of tungsten (W) and zirconium (Zr) exceeds a certain level, not only excessive characteristic effects, but also an increase in manufacturing cost are induced, so the present invention may limit the content of tungsten (W) and zirconium (Zr) to 0.5% or less, respectively.

One or more of antimony (Sb): 0 to 0.5% and tin (Sn): 0 to 0.5%

Since antimony (Sb) and tin (Sn) are elements that improve plating wettability and plating adhesion of a steel sheet, in the present invention, one or more of antimony (Sb) and tin (Sn) may be added to achieve such an effect. However, when the content of antimony (Sb) and tin (Sn) exceeds a certain level, brittleness of a steel sheet increases, and thus, cracks may occur during hot working or cold working, so the present invention may limit the content of antimony (Sb) and tin (Sn) to 0.5% or less, respectively.

One or more of yttrium (Y): 0 to 0.2% and hafnium (Hf): 0 to 0.2%

Since yttrium (Y) and hafnium (Hf) are elements that improve corrosion resistance of a steel sheet, in the present invention, one or more of the yttrium (Y) and hafnium (Hf) may be added to achieve such an effect. However, when the content of yttrium (Y) and hafnium (Hf) exceeds a certain level, the ductility of the steel sheet may deteriorate, so the present invention may limit the content of yttrium (Y) and hafnium (Hf) to 0.2% or less, respectively.

Cobalt (Co): 0 to 1.5%

Since cobalt (Co) is an element that promotes bainite transformation to increase a TRIP effect, in the present invention, cobalt (Co) may be added to achieve such an effect. However, when the content of cobalt (Co) exceeds a certain level, since weldability and ductility of a steel sheet may deteriorate, the present invention may limit the content of cobalt (Co) to 1.5% or less.

The high strength steel sheet having superior workability according to an aspect of the present disclosure may include a balance of Fe and other unavoidable impurities in addition to the components described above. However, in a general manufacturing process, unintended impurities may inevitably be mixed from a raw material or the surrounding environment, and thus, these impurities may not be completely excluded. Since these impurities are known to those skilled in the art, all the contents are not specifically mentioned in the present specification. In addition, additional addition of effective components other than the above-described components is not entirely excluded.

The high strength steel sheet having superior workability according to an aspect of the present invention may include, as microstructures, ferrite which is a soft structure, and tempered martensite, bainite, and retained austenite which are hard structures. Here, the soft structure and the hard structure may be interpreted as a concept distinguished by a relative hardness difference.

As a preferred example, the microstructure of the high strength steel sheet having superior workability according to an aspect of the present invention may include, by volume fraction, 30 to 70% of tempered martensite, 10 to 45% of bainite, 10 to 40% of retained austenite, 3 to 20% of ferrite, and an unavoidable structure. As the unavoidable structure of the present invention, fresh martensite, perlite, martensite austenite constituent (M-A), and the like may be included. When the fresh martensite or the pearlite is excessively formed, the workability of the steel sheet may be lowered or the fraction of the retained austenite may be lowered.

The high strength steel sheet having superior workability according to an aspect of the present invention, as shown in the following [Relational Expression 1], a ratio of an average nanohardness value ($[H]_F$, Hv) of the soft structure (ferrite) to an average nanohardness value ($[H]_{TM+B+\gamma}$, Hv) of the hard structure (tempered martensite, bainite, and retained austenite) may satisfy a range of 0.4 to 0.9.

$$0.4 \leq [H]_F/[H]_{TM+B+\gamma} \leq 0.9 \quad \text{[Relational Expression 1]}$$

The nanohardness values of the hard and soft structures may be measured using a nanoindenter (FISCHERSCOPE HM2000). Specifically, after electropolishing the surface of the steel sheet, the hard and soft structures are randomly measured at 20 points or more under the condition of an indentation load of 10,000 μN, and the average nanohardness value of the hard and soft structures may be calculated based on the measured values.

In addition, in the high strength steel sheet having superior workability according to an aspect of the present invention, as shown in the following [Relational Expression 2], the fraction (T(γ), vol %) of the retained tempered austenite of the steel sheet to the fraction (V(γ), vol %) of the retained austenite of the steel sheet may be 0.1 or more.

$T(\gamma)/V(\gamma) \geq 0.1$ [Relational Expression 2]

In the high strength steel sheet having superior workability according to an aspect of the present invention, since a balance $B_{T-E}$ of tensile strength and elongation expressed by the following [Relational Expression 3] is 22,000 (MPa %) or more, a balance $B_{T-H}$ of tensile strength and hole expansion ratio expressed by the following [Relational Expression 4] is $7*10^6$ (MPa²%$^{1/2}$) or more, and bendability $B_R$ expressed by the following [Relational Expression 5] satisfies a range of 0.5 to 3.0, it may have a superior balance of strength and ductility, a balance of strength and hole expansion ratio, and superior bending formability.

$160B_{T-E}$=[Tensile Strength(TS,MPa)][Elongation(El, %)] [Relational Expression 3]

$B_{T-H}$=[Tensile Strength(TS,MPa)]²*[Hole Expansion Ratio(HER,%)]$^{1/2}$ [Relational Expression 4]

$B_R=R/t$ [Relational Expression 5]

where R means a minimum bending radius (mm) at which cracks do not occur after a 90° bending test, and t means a thickness (mm) of the steel sheet.

In the present invention, it is important to stabilize retained austenite of a steel sheet because it is intended to simultaneously secure superior ductility and bending formability as well as high strength properties. In order to stabilize the retained austenite, it is necessary to concentrate carbon (C) and manganese (Mn) in the ferrite, bainite, and tempered martensite of the steel sheet into austenite. However, when carbon (C) is concentrated into austenite by using ferrite, the strength of the steel sheet may be insufficient due to the low strength characteristics of ferrite, and excessive inter-phase hardness difference may occur, thereby reducing the hole expansion ratio (HER). Therefore, it is intended to concentrate carbon (C) and manganese (Mn) into austenite by using the bainite and tempered martensite.

When the content of silicon (Si) and aluminum (Al) in the retained austenite is limited to a certain range, carbon (C) and manganese (Mn) may be concentrated in large amounts from bainite and tempered martensite into retained austenite, thereby effectively stabilizing the retained austenite. In addition, by limiting the content of silicon (Si) and aluminum (Al) in austenite to a certain range, it is possible to increase the content of silicon (Si) and aluminum (Al) in ferrite. As the content of silicon (Si) and aluminum (Al) in the ferrite increases, the hardness of the ferrite increases, so it is possible to effectively reduce an inter-phase hardness difference of ferrite which is a soft structure and tempered martensite, bainite, and retained austenite which are a hard structure.

When the ratio of the average nanohardness value ($[H]_F$, Hv) of the soft structure (ferrite) to the average nanohardness value ($[H]_{TM+B+\gamma}$, Hv) of the hard structure (tempered martensite, bainite, and retained austenite) is greater than a certain level, the inter-phase hardness difference of the soft structure (ferrite) and the hard structure (tempered martensite, bainite, and retained austenite) is lowered, so it is possible to secure a desired balance (TSXEl) of tensile strength and elongation, a balance (TS²XHER$^{1/2}$) of tensile strength and hole expansion ratio, and bendability (R/t). On the other hand, when the ratio of the average nanohardness value ($[H]_F$, Hv) of the soft structure (ferrite) to the average nanohardness value ($[H]_{TM+B+\gamma}$, Hv) of the hard structure (tempered martensite, bainite, and retained austenite) is excessive, the ferrite is excessively hardened and the workability is rather lowered, so the desired balance (TSXEl) of tensile strength and elongation, the balance of tensile strength and hole expansion ratio (TS²XHER$^{1/2}$), and the bendability (R/t) may not all be secured Therefore, the present invention may limit the ratio of the average nanohardness value ($[H]_F$, Hv) of the soft structure to the average nanohardness value ($[H]_{TM+B+\gamma}$, Hv) of the hard structure (tempered martensite, bainite, and retained austenite) to a range of 0.4 to 0.9.

Meanwhile, in the retained austenite, the tempered retained austenite is heat-treated at a bainite formation temperature to increase an average size, and by suppressing the transformation from austenite to martensite, it is possible to improve the workability of the steel sheet. That is, in order to improve the ductility and workability of the steel sheet, it is preferable to increase the fraction of the tempered retained austenite in the retained austenite.

Therefore, in the high strength steel sheet having superior workability according to an aspect of the present invention, the ratio of the fraction (T(γ), volume %) of the tempered retained austenite of the steel sheet to the retained austenite fraction (V(γ), volume %) of the steel sheet may be limited to 0.1 or more. When the ratio of the fraction (T(γ), vol %) of the tempered retained austenite of the steel sheet to the retained austenite fraction (V(γ), vol %) of the steel sheet is less than 0.1, the bending formability R/t does not satisfy 0.5 to 3.0, so there is a problem in that the desired workability may not be secured.

A steel sheet including retained austenite has superior ductility and bending formability due to transformation-induced plasticity that occurs during transformation from austenite to martensite during processing. When the fraction of the retained austenite is less than a certain level, the balance (TSXEl) of tensile strength and elongation may be less than 22,000 MPa %, or the bendability (R/t) may exceed 3.0. Meanwhile, when the fraction of the retained austenite exceeds a certain level, local elongation may be lowered. Accordingly, in the present invention, the fraction of the retained austenite may be limited to a range of 10 to 40 vol % in order to obtain a steel sheet having a balance (TSXEl) of tensile strength and elongation and superior bendability (R/t).

Meanwhile, both untempered martensite (fresh martensite) and tempered martensite are microstructures that improve the strength of the steel sheet. However, compared with the tempered martensite, fresh martensite has a characteristic of greatly reducing the ductility and the hole expansion ratio of the steel sheet. This is because the microstructure of the tempered martensite is softened by the tempering heat treatment. Therefore, in the present invention, it is preferable to use tempered martensite to provide a steel sheet which is superior in the balance of strength and ductility, the balance of strength and hole expansion ratio, and the bending formability. When the fraction of the tempered martensite is less than a certain level, it is difficult to secure the balance (TSXEl) of tensile strength and elongation of 22,000 MPa % or more or the balance (TS²XHER$^{1/2}$) of tensile strength and hole expansion ratio of $7*10^6$ (MPa²%$^{1/2}$) or more, and when the fraction of the tempered martensite exceeds a certain level, ductility and workability is lowered, and the balance (TSXEl) of tensile strength and elongation is less than 22,000 MPa %, or bendability (R/t) exceeds 3.0, which is not preferable. Therefore, in the present invention, the fraction of the tempered martensite may be limited to 30 to 70 vol % to obtain a steel sheet having the balance (TSXEl) of tensile strength and elongation, the balance (TS$^2$XHER$^{1/2}$) of tensile strength and hole expansion ratio, and superior bendability (R/t).

In order to improve the balance (TSXEl) of tensile strength and elongation, the balance (TS$^2$XHER$^{1/2}$) of tensile strength and hole expansion ratio, and the bendability (R/t), it is preferable that bainite is appropriately included as the microstructure. As long as a fraction of bainite is a certain level or more, it is possible to secure the balance (TSXEl) of tensile strength and elongation of 22,000 MPa % or more, the balance (TS$^2$XHER$^{1/2}$) of tensile strength and hole expansion ratio of 7*10$^6$ (MPa$^2$%$^{1/2}$) or more and the bendability (R/t) of 0.5 to 3.0. On the other hand, when the fraction of bainite is excessive, the decrease in the fraction of tempered martensite is necessarily accompanied, so the present invention may not secure the desired balance (TSXEl) of tensile strength and elongation, the balance (TS$^2$XHER$^{1/2}$) of tensile strength and hole expansion ratio, and bendability (R/t). Accordingly, the present invention may limit the fraction of bainite to a range of 10 to 45 vol %.

Since ferrite is an element contributing to improvement in ductility, the present invention may secure the desired balance (TSXEl) of tensile strength and elongation, as long as the fraction of ferrite is a certain level or more. However, when the fraction of ferrite is excessive, the inter-phase hardness difference increases and the hole expansion ratio (HER) may decrease, so the present invention may not secure the desired balance (TS$^2$XHER$^{1/2}$) of tensile strength and hole expansion ratio. Accordingly, the present invention may limit the fraction of ferrite to a range of 3 to 20 vol %.

Hereinafter, an example of a method for manufacturing a steel sheet of the present invention will be described in detail.

A method for manufacturing a high strength steel sheet having superior workability according to an aspect of the present invention may include: providing a cold-rolled steel sheet having a predetermined component; heating (primarily heating) the cold-rolled steel sheet to a temperature within a range of Ac1 or higher and less than Ac3, and maintaining (primarily maintaining) the primarily heated steel sheet for 50 seconds or more; cooling (primarily cooling) the primarily heated steel sheet to a temperature within a range of 600 to 850° C. (primarily cooling stop temperature) at an average cooling rate of 1° C./s or more; cooling (secondarily cooling) the primarily cooled steel sheet to a temperature within a range of 300 to 500° C. at an average cooling rate of 2° C./s or more, and maintaining (secondarily maintaining) the secondarily cooled steel sheet in the temperature within a range for 5 seconds or more; cooling (tertiarily cooling) the secondarily cooled steel sheet to a temperature within a range of 100 to 300° C. (secondarily cooling stop temperature) at an average cooling rate of 2° C./s or more; heating (secondarily heating) the tertiarily cooled steel sheet to a temperature within a range of 300 to 500° C., and maintaining (tertiarily maintaining) the secondarily heated steel sheet in the temperature within a range for 50 seconds or more; and cooling (quaternarily cooling) the secondarily heated steel sheet to room temperature.

In addition, the cold-rolled steel sheet of the present invention may be provided by heating a steel slab to 1000 to 1350° C.; performing finishing hot rolling in a temperature within a range of 800 to 1000° C.; coiling the hot-rolled steel sheet in a temperature within a range of 300 to 600° C.; performing hot-rolled annealing heat treatment on the coiled steel sheet in a temperature within a range of 650 to 850° C. for 600 to 1700 seconds; and cold rolling the hot-rolled annealing heat-treated steel sheet at a reduction ratio of 30 to 90%.

Preparation and Heating of Steel Slab

A steel slab having a predetermined component is prepared. Since the steel slab according to the present invention includes an alloy composition corresponding to an alloy composition of the steel sheet described above, the description of the alloy compositions of the slab is replaced by the description of the alloy composition of the steel sheet described above.

The prepared steel slab may be heated to a certain temperature within a range, and the heating temperature of the steel slab at this time may be in the range of 1000 to 1350° C. This is because, when the heating temperature of the steel slab is less than 1000° C., the steel slab may be hot rolled in the temperature within a range below the desired finish hot rolling temperature within a range, and when the heating temperature of the steel slab exceeds 1350° C., the temperature reaches a melting point of steel, and thus, the steel slab is melted.

Hot Rolling and Coiling

The heated steel slab may be hot rolled, and thus, provided as a hot-rolled steel sheet. During the hot rolling, the finish hot rolling temperature is preferably in the range of 800 to 1000° C. When the finish hot rolling temperature is less than 800° C., an excessive rolling load may be a problem, and when the finish hot rolling temperature exceeds 1000° C., grains of the hot-rolled steel sheet are coarsely formed, which may cause a deterioration in physical properties of the final steel sheet.

The hot-rolled steel sheet after the hot rolling has been completed may be cooled at an average cooling rate of 10° C./s or more, and may be coiled at a temperature of 300 to 600° C. When the coiling temperature is less than 300° C., the coiling is not easy, and when the coiling temperature exceeds 600° C., a surface scale is formed to the inside of the hot-rolled steel sheet, which may make pickling difficult.

Hot-Rolled Annealing Heat Treatment

It is preferable to perform a hot-rolled annealing heat treatment process in order to facilitate pickling and cold rolling, which are subsequent processes after the coiling. The hot-rolled annealing heat treatment may be performed in a temperature within a range of 650 to 850° C. for 600 to 1700 seconds. When the hot-rolled annealing heat treatment temperature is less than 650° C. or the hot-rolled annealing heat treatment time is less than 600 seconds, the strength of the hot-rolled annealing heat-treated steel sheet increases, and thus, subsequent cold rolling may not be easy. On the other hand, when the hot-rolled annealing heat treatment temperature exceeds 850° C. or the hot-rolled annealing heat treatment time exceeds 1700 seconds, the pickling may not be easy due to a scale formed deep inside the steel sheet.

Pickling and Cold Rolling

After the hot-rolled annealing heat treatment, in order to remove the scale generated on the surface of the steel sheet, the pickling may be performed, and the cold rolling may be performed. Although the conditions of the pickling and cold rolling are not particularly limited in the present invention, the cold rolling is preferably performed at a cumulative reduction ratio of 30 to 90%. When the cumulative reduction ratio of the cold rolling exceeds 90%, it may be difficult to perform the cold rolling in a short time due to the high strength of the steel sheet.

The cold-rolled steel sheet may be manufactured as a non-plated cold-rolled steel sheet through the annealing heat treatment process, or may be manufactured as a plated steel sheet through a plating process to impart corrosion resistance. As the plating, plating methods such as hot-dip galvanizing, electro-galvanizing, and hot-dip aluminum plating may be applied, and the method and type are not particularly limited.

Annealing Heat Treatment

In the present invention, in order to simultaneously secure the strength and workability of the steel sheet, the annealing heat treatment process is performed.

The cold-rolled steel sheet is heated (primarily heated) to a temperature within a range of Ac1 or higher and less than Ac3 (two-phase region), and maintained (primarily maintained) in the temperature within a range for 50 seconds or more. The primary heating or primary maintaining temperature is Ac3 or higher (single-phase region), the desired ferrite structure may not be realized, so the desired level of $[H]_F/[H]_{TM+B+\gamma}$, and the balance ($TS^2 \times HER^{1/2}$) of tensile strength and hole expansion ratio may be implemented. In addition, when the primary heating or primary maintaining temperature is in a temperature within a range less than Ac1, there is a fear that sufficient heating is not made, and thus, the microstructure desired by the present invention may not be implemented even by subsequent heat treatment. The average temperature increase rate of the primary heating may be 5° C./s or more.

When the primary maintaining time is less than seconds, the structure may not be sufficiently homogenized and the physical properties of the steel sheet may be lowered. The upper limit of the primary maintaining time is not particularly limited, but the primary heating time is preferably limited to 1200 seconds or less in order to prevent the decrease in toughness due to the coarsening of grains.

After the primarily maintaining, it is preferable to cool (primarily cool) the cold-rolled steel sheet to a temperature within a range (primarily cooling stop temperature) of 600 to 850° C. at an average cooling rate of 1° C./s or more. The upper limit of the average cooling rate of the primary cooling does not need to be particularly specified, but is preferably limited to 100° C./s or less. When the primary cooling stop temperature is less than 600° C., the ferrite is excessively formed and the retained austenite is insufficient, and $[H]_F/[H]_{TM+B+\gamma}$ and the balance (TSXEl) of tensile strength and elongation may be lowered. In addition, since it is preferable that the upper limit of the primary cooling stop temperature is 30° C. or lower than the primary maintaining temperature, the upper limit of the primary cooling stop temperature may be limited to 850° C.

After the primarily cooling, it is preferable to cool (secondarily cool) the primarily cooled steel sheet to a temperature within a range of 300 to 500° C. at an average cooling rate of 2° C./s or more, and to maintain (secondarily maintain) the secondarily cooled steel sheet in the temperature within a range for 5 seconds or more. When the average cooling rate of the secondary cooling is less than 2° C./s, the ferrite is excessively formed and the retained austenite is insufficient, so $[H]_F/[H]_{TM+B+\gamma}$ and the balance (TSXEl) of tensile strength and elongation may be lowered. The upper limit of the average cooling rate of the secondary cooling does not need to be particularly specified, but is preferably limited to 100° C./s or less. Meanwhile, when the secondary maintaining temperature exceeds 500° C., the retained austenite is insufficient, so $[H]_F/[H]_{TM+B+\gamma}$, $T(\gamma)/V(\gamma)$, the balance (TSXEl) of tensile strength and elongation, and the bendability (R/t) may be lowered. In addition, when the secondary maintaining temperature is less than 300° C., $T(\gamma)/V(\gamma)$ and the bending formability R/t may be lowered due to the low heat treatment temperature. When the secondary maintaining temperature is less than 5 seconds, $T(\gamma)/V(\gamma)$ and the bending formability R/t may be lowered due to the low heat treatment temperature. On the other hand, the upper limit of the secondary maintaining time does not need to be particularly specified, but is preferably set to 600 seconds or less.

Meanwhile, it is preferable that the average cooling rate Vc1 of the primary cooling is smaller than the average cooling rate Vc2 of the secondary cooling (Vc1<Vc2).

After the secondarily maintaining, it is preferable to cool (tertiarily cool) the cold-rolled steel sheet to a temperature within a range (secondarily cooling stop temperature) of 100 to 300° C. at an average cooling rate of 2° C./s or more. When the average cooling rate of the tertiary cooling is less than 2° C./s, $[H]_F/[H]_{TM+B+\gamma}$, $T(\gamma)/V(\gamma)$, and the bendability (R/t) may be lowered due to slow cooling. The upper limit of the average cooling rate of the tertiary cooling does not need to be particularly specified, but is preferably limited to 100° C./s or less. Meanwhile, when the secondary cooling stop temperature exceeds 300° C., the bainite is excessively formed and the tempered martensite is insufficient, so $T(\gamma)/V(\gamma)$ and the balance (TSXEl) of tensile strength and elongation may be lowered. On the other hand, when the secondary cooling stop temperature is less than 100° C., the tempered martensite is excessively formed and the retained austenite is insufficient, so $[H]_F/[H]_{TM+B+\gamma}$, $T(\gamma)/V(\gamma)$, the balance (TSXEl) of tensile strength and elongation, and the bendability (R/t) may be lowered.

After the tertiarily cooling, it is preferable to heat (secondarily heat) the tertiarily cooled steel sheet to a temperature within a range of 300 to 500° C., and maintain (tertiarily maintain) the secondarily heated steel sheet in the temperature within a range for 10 seconds or more. Meanwhile, when the tertiary maintaining temperature exceeds 550° C., the retained austenite is insufficient, so $[H]_F/[H]_{TM+B+\gamma}$, $T(\gamma)/V(\gamma)$, the balance (TSXEl) of tensile strength and elongation, and the bendability (R/t) may be lowered. Meanwhile, when the tertiary maintaining temperature is less than 350° C., the retained austenite is insufficient due to the low maintaining temperature, so $[H]_F/[H]_{TM+B+\gamma}$, $T(\gamma)/V(\gamma)$, the balance (TSXEl) of tensile strength and elongation, and the bendability (R/t) may be lowered. When the tertiary maintaining time is less than 50 seconds, the tempered martensite is excessively formed and the retained austenite is insufficient, so $[H]_F/[H]_{TM+B+\gamma}$, $T(\gamma)/V(\gamma)$, the balance (TSXEl) of tensile strength and elongation, and the bendability (R/t) may be lowered. The upper limit of the tertiary maintaining time is not particularly limited, but a preferred tertiary maintaining time may be 1800 seconds or less. The average temperature increase rate of the primary heating may be 5° C./s or more.

After the tertiarily maintaining, it is preferable to cool (quaternarily cool) the cold-rolled steel sheet to room temperature at an average cooling rate of 1° C./s or more.

The high strength steel sheet having superior workability manufactured by the above-described manufacturing method may include, as a microstructure, tempered martensite, bainite, retained austenite, and ferrite, and as a preferred example, may include, by the volume fraction, 30 to 70% of tempered martensite, 10 to 45% of bainite, 10 to 40% of retained austenite, 3 to 20% of ferrite, and unavoidable structures.

In the high strength steel sheet having superior workability manufactured by the above-described manufacturing method, as shown in the following [Relational Expression 1], the ratio of the average nanohardness value ($[H]_F$, Hv) of the soft structure (ferrite) to the average nanohardness value ([H]$_{TM+B+\gamma}$, Hv) of the hard structure (tempered martensite, bainite, and retained austenite) may satisfy the range of 0.4 to 0.9, and, as shown in the following [Relational Expression 2], the ratio of the fraction (T(γ), vol %) of retained austenite of the steel sheet to the fraction (V(γ), vol %) of retained austenite of the steel sheet may satisfy 0.1 or more.

$$0.4 \leq [H]_F/[H]_{TM+B+\gamma} \leq 0.9 \quad \text{[Relational Expression 1]}$$

$$T(\gamma)/V(\gamma) \geq 0.1 \quad \text{[Relational Expression 2]}$$

In the high strength steel sheet having superior workability manufactured by the above-described manufacturing method, a balance B$_{T-E}$ of tensile strength and elongation expressed by the following [Relational Expression 3] is 22,000 (MPa·%), a balance B$_{T-H}$ of tensile strength and hole expansion ratio expressed by the following [Relational Expression 4] is $7*10^6$ (MPa$^2$%$^{1/2}$) or more, and bending formability B$_R$ expressed by the following [Relational Expression 5] may satisfy a range of 0.5 to 3.0.

$$B_{T-E} = [\text{Tensile Strength(TS,MPa)}]*[\text{Elongation (EL,\%)}] \quad \text{[Relational Expression 3]}$$

$$B_{T-H} = [\text{Tensile Strength(TS,MPa)}]^2*[\text{Hole Expansion Ratio(HER,\%)}]^{1/2} \quad \text{[Relational Expression 4]}$$

$$B_R = R/t \quad \text{[Relational Expression 5]}$$

where R means a minimum bending radius (mm) at which cracks do not occur after a 90° bending test, and t means a thickness (mm) of the steel sheet.

MODE FOR INVENTION

Hereinafter, a high strength steel sheet having superior workability and a method for manufacturing same according to an aspect of the present invention will be described in more detail. It should be noted that the following examples are only for the understanding of the present invention, and are not intended to specify the scope of the present invention. The scope of the present invention is determined by matters described in claims and matters reasonably inferred therefrom.

Inventive Example

A steel slab having a thickness of 100 mm having alloy compositions (a balance of Fe and unavoidable impurities) shown in Table 1 below was prepared, heated at 1200° C., and then was subjected to finish hot rolling at 900° C. Thereafter, the steel slab was cooled at an average cooling rate of 30° C./s, and coiled at a coiling temperature of Tables 2 and 3 to manufacture a hot-rolled steel sheet having a thickness of 3 mm. The hot-rolled steel sheet was subjected to hot-rolled annealing heat treatment under the conditions of Tables 2 and 3. Thereafter, after removing a surface scale by pickling, cold rolling was performed to a thickness of 1.5 mm.

Thereafter, the heat treatment was performed under the annealing heat treatment conditions disclosed in Tables 2 to 7 to manufacture the steel sheet.

The microstructure of the thus prepared steel sheet was observed, and the results are illustrated in Tables 8 and 9. Among the microstructures, ferrite (F), bainite (B), tempered martensite (TM), and pearlite (P) were observed through SEM after nital-etching a polished specimen cross section. The fractions of bainite and tempered martensite, which are difficult to distinguish among them, were calculated using an expansion curve after evaluation of dilatation. Meanwhile, since fresh martensite (FM) and retained austenite (retained γ) are also difficult to distinguish, a value obtained by subtracting the fraction of retained austenite calculated by X-ray diffraction method from the fraction of martensite and retained austenite observed by the SEM was determined as the fraction of the fresh martensite.

Meanwhile, [H]$_F$/[H]$_{TM+B+\gamma}$, T(γ)/V(γ), a balance (TSXEl) of tensile strength and elongation, a balance (TS$^2$XHER$^{1/2}$) of tensile strength and hole expansion ratio, and bendability (R/t) of a steel sheet were observed, and the results are illustrated in Tables 10 and 11.

Nanohardness values of hard and soft structures were measured using the nanoindentation method. Specifically, after electropolishing surfaces of each specimen, the hard and soft structures were randomly measured at 20 points or more under the condition of an indentation load of 10,000 μN using a nanoindenter (FISCHERSCOPE HM2000), and the average nanohardness value of the hard and soft structures was calculated based on the measured values.

The fraction (V(γ)) of the retained austenite of the steel sheet was determined as an area measured in the retained austenite using a phase map of the EPMA.

Tensile strength (TS) and elongation (El) were evaluated through a tensile test, and the tensile strength (TS) and the elongation (El) were measured by evaluating the specimens collected in accordance with JIS No. 5 standard based on a 90° direction with respect to a rolling direction of a rolled sheet. The bendability (R/t) was evaluated by a V-bending test, and calculated by collecting a specimen based on the 90° direction with respect to the rolling direction of the rolled sheet and being determined as a value obtained by dividing a minimum bending radius R, at which cracks do not occur after a 90° bending test, by a thickness t of a sheet. The hole expansion ratio (HER) was evaluated through the hole expansion test, and was calculated by the following [Relational Expression 6] by, after forming a punching hole (die inner diameter of 10.3 mm, clearance of 12.5%) of 10 mmØ, inserting a conical punch having an apex angle of 60° into a punching hole in a direction in which a burr of a punching hole faces outward, and then compressing and expanding a peripheral portion of the punching hole at a moving speed of 20 mm/min.

$$\text{Hole Expansion Ratio(HER,\%)} = \{(D-D_0)/D_0\}*100 \quad \text{[Relational Expression 6]}$$

where D means a hole diameter (mm) when cracks penetrate through the steel plate along the thickness direction, and D$_0$ means the initial hole diameter (mm).

TABLE 1

| Steel type | Chemical Component (wt %) | | | | | | | | | |
|---|---|---|---|---|---|---|---|---|---|---|
| | C | Si | Mn | P | S | Al | N | Cr | Mo | Others |
| A | 0.38 | 1.78 | 2.24 | 0.013 | 0.0012 | 0.45 | 0.0032 | 0.53 | | |
| B | 0.34 | 2.04 | 2.08 | 0.010 | 0.0007 | 0.49 | 0.0037 | 0.24 | 0.27 | |
| C | 0.36 | 2.25 | 2.34 | 0.009 | 0.0013 | 0.54 | 0.0030 | | 0.46 | |
| D | 0.35 | 2.17 | 3.85 | 0.011 | 0.0010 | 0.48 | 0.0025 | | 0.54 | |

TABLE 1-continued

| Steel type | Chemical Component (wt %) | | | | | | | | | |
|---|---|---|---|---|---|---|---|---|---|---|
| | C | Si | Mn | P | S | Al | N | Cr | Mo | Others |
| E | 0.42 | 1.79 | 2.37 | 0.008 | 0.0007 | 0.53 | 0.0033 | | | |
| F | 0.55 | 1.42 | 2.74 | 0.008 | 0.0011 | 0.62 | 0.0031 | | | |
| G | 0.68 | 1.67 | 1.85 | 0.010 | 0.0010 | 0.99 | 0.0028 | | | |
| H | 0.37 | 1.52 | 2.14 | 0.011 | 0.0015 | 1.53 | 0.0034 | | | |
| I | 0.39 | 1.35 | 1.58 | 0.007 | 0.0007 | 2.46 | 0.0035 | | | |
| J | 0.36 | 0.03 | 2.85 | 0.009 | 0.0010 | 4.60 | 0.0030 | | | Ti 0.04 |
| K | 0.41 | 2.24 | 2.51 | 0.012 | 0.0011 | 0.48 | 0.0026 | | | Nb 0.04 |
| L | 0.45 | 2.18 | 2.60 | 0.010 | 0.0010 | 0.33 | 0.0028 | | | V 0.05 |
| M | 0.39 | 1.63 | 1.92 | 0.009 | 0.0009 | 0.65 | 0.0032 | | | Ni 0.32 |
| N | 0.32 | 1.49 | 2.38 | 0.011 | 0.0013 | 0.58 | 0.0025 | | | Cu 0.34 |
| O | 0.35 | 1.72 | 2.81 | 0.010 | 0.0011 | 0.52 | 0.0028 | | | B 0.0022 |
| P | 0.38 | 1.36 | 2.05 | 0.008 | 0.0009 | 0.50 | 0.0033 | | | Ca 0.003 |
| Q | 0.36 | 1.69 | 2.46 | 0.009 | 0.0008 | 0.48 | 0.0034 | | | REM 0.002 |
| R | 0.43 | 1.51 | 2.73 | 0.011 | 0.0008 | 0.54 | 0.0030 | | | Mg 0.001 |
| S | 0.41 | 1.37 | 2.62 | 0.010 | 0.0011 | 0.49 | 0.0028 | | | W 0.16 |
| T | 0.37 | 1.56 | 2.18 | 0.009 | 0.0009 | 0.63 | 0.0025 | | | Zr 0.14 |
| U | 0.34 | 1.83 | 2.89 | 0.011 | 0.0008 | 0.55 | 0.0029 | | | Sb 0.03 |
| V | 0.38 | 1.56 | 2.24 | 0.008 | 0.0010 | 0.72 | 0.0032 | | | Sn 0.04 |
| W | 0.32 | 1.72 | 2.38 | 0.009 | 0.0011 | 0.63 | 0.0027 | | | Y 0.02 |
| X | 0.27 | 3.83 | 1.52 | 0.007 | 0.0014 | 0.47 | 0.0033 | | | Hf 0.02 |
| Y | 0.37 | 2.57 | 2.67 | 0.011 | 0.0012 | 0.51 | 0.0027 | | | Co 0.37 |
| χA | 0.23 | 1.74 | 2.84 | 0.012 | 0.0008 | 0.59 | 0.0025 | | | |
| χB | 0.78 | 1.69 | 2.55 | 0.009 | 0.0010 | 0.48 | 0.0029 | | | |
| XC | 0.38 | 0.02 | 2.71 | 0.007 | 0.0009 | 0.03 | 0.0024 | | | |
| XD | 0.34 | 4.17 | 2.48 | 0.012 | 0.0013 | 0.03 | 0.0030 | | | |
| χE | 0.36 | 0.02 | 2.52 | 0.009 | 0.0008 | 5.25 | 0.0026 | | | |
| XF | 0.43 | 1.63 | 0.84 | 0.008 | 0.0010 | 0.51 | 0.0036 | | | |
| XG | 0.36 | 1.85 | 5.20 | 0.011 | 0.0011 | 0.46 | 0.0027 | | | |
| χH | 0.39 | 2.23 | 2.25 | 0.009 | 0.0009 | 0.49 | 0.0034 | 3.23 | | |
| XI | 0.34 | 2.45 | 2.37 | 0.008 | 0.0008 | 0.57 | 0.0028 | | 3.25 | |

TABLE 2

| Specimen No. | Steel type | Coiling temperature of hot-rolled steel sheet (° C.) | Annealing temperature of hot-rolled steel sheet (° C.) | Annealing time of hot-rolled steel sheet (s) | Primary average heating rate (° C./s) | Primary maintaining temperature section (° C.) | Primary maintaining time (s) |
|---|---|---|---|---|---|---|---|
| 1 | A | 500 | 700 | 1500 | 10 | Two-phase region | 120 |
| 2 | A | 550 | 900 | 1100 | Poor pickling | | |
| 3 | A | 550 | 600 | 1400 | Occurrence of fracture during cold rolling | | |
| 4 | A | 500 | 800 | 1800 | Poor pickling | | |
| 5 | A | 350 | 650 | 500 | Occurrence of fracture during cold rolling | | |
| 6 | A | 500 | 700 | 1300 | 10 | Single-phase region | 120 |
| 7 | A | 500 | 750 | 1200 | 10 | Two-phase region | 120 |
| 8 | A | 550 | 700 | 1600 | 10 | Two-phase region | 120 |
| 9 | A | 400 | 800 | 900 | 10 | Two-phase region | 120 |
| 10 | B | 550 | 650 | 1000 | 10 | Two-phase region | 120 |
| 11 | C | 500 | 750 | 1400 | 10 | Two-phase region | 120 |
| 12 | C | 400 | 800 | 800 | 10 | Two-phase region | 120 |
| 13 | C | 450 | 650 | 1400 | 10 | Two-phase region | 120 |
| 14 | C | 500 | 700 | 1200 | 10 | Two-phase region | 120 |
| 15 | C | 450 | 800 | 800 | 10 | Two-phase region | 120 |
| 16 | C | 350 | 650 | 1500 | 10 | Two-phase region | 120 |
| 17 | C | 500 | 700 | 1600 | 10 | Two-phase region | 120 |
| 18 | C | 500 | 800 | 1000 | 10 | Two-phase region | 120 |
| 19 | C | 450 | 700 | 700 | 10 | Two-phase region | 120 |

TABLE 2-continued

| Specimen No. | Steel type | Coiling temperature of hot-rolled steel sheet (° C.) | Annealing temperature of hot-rolled steel sheet (° C.) | Annealing time of hot-rolled steel sheet (s) | Primary average heating rate (° C./s) | Primary maintaining temperature section (° C.) | Primary maintaining time (s) |
|---|---|---|---|---|---|---|---|
| 20 | C | 550 | 650 | 1300 | 10 | Two-phase region | 120 |
| 21 | D | 450 | 700 | 1200 | 10 | Two-phase region | 120 |
| 22 | E | 500 | 650 | 1500 | 10 | Two-phase region | 120 |
| 23 | F | 350 | 750 | 1700 | 10 | Two-phase region | 120 |
| 24 | G | 500 | 850 | 600 | 10 | Two-phase region | 120 |
| 25 | H | 350 | 800 | 900 | 10 | Two-phase region | 120 |
| 26 | I | 500 | 750 | 1100 | 10 | Two-phase region | 120 |

TABLE 3

| Specimen No. | Steel type | Coiling temperature of hot-rolled steel sheet (° C.) | Annealing temperature of hot-rolled steel sheet (° C.) | Annealing time of hot-rolled steel sheet (s) | Primary average heating rate (° C./s) | Primary maintaining temperature section (° C.) | Primary maintaining time (s) |
|---|---|---|---|---|---|---|---|
| 27 | J | 500 | 700 | 1000 | 10 | Two-phase region | 120 |
| 28 | K | 550 | 650 | 1300 | 10 | Two-phase region | 120 |
| 29 | L | 450 | 650 | 900 | 10 | Two-phase region | 120 |
| 30 | M | 550 | 750 | 1100 | 10 | Two-phase region | 120 |
| 31 | N | 550 | 700 | 1000 | 10 | Two-phase region | 120 |
| 32 | O | 500 | 800 | 1500 | 10 | Two-phase region | 120 |
| 33 | P | 400 | 750 | 700 | 10 | Two-phase region | 120 |
| 34 | Q | 550 | 850 | 1400 | 10 | Two-phase region | 120 |
| 35 | R | 450 | 700 | 1300 | 10 | Two-phase region | 120 |
| 36 | S | 500 | 750 | 1000 | 10 | Two-phase region | 120 |
| 37 | T | 550 | 750 | 1600 | 10 | Two-phase region | 120 |
| 38 | U | 550 | 650 | 1200 | 10 | Two-phase region | 120 |
| 39 | V | 450 | 650 | 800 | 10 | Two-phase region | 120 |
| 40 | W | 400 | 700 | 1000 | 10 | Two-phase region | 120 |
| 41 | X | 500 | 750 | 700 | 10 | Two-phase region | 120 |
| 42 | Y | 550 | 700 | 1500 | 10 | Two-phase region | 120 |
| 43 | XA | 550 | 800 | 1200 | 10 | Two-phase region | 120 |
| 44 | XB | 500 | 850 | 1000 | 10 | Two-phase region | 120 |
| 45 | XC | 450 | 700 | 1400 | 10 | Two-phase region | 120 |
| 46 | XD | 500 | 750 | 800 | 10 | Two-phase region | 120 |
| 47 | XE | 450 | 750 | 1300 | 10 | Two-phase region | 120 |
| 48 | XF | 500 | 700 | 1000 | 10 | Two-phase region | 120 |
| 49 | XG | 550 | 700 | 1400 | 10 | Two-phase region | 120 |
| 50 | XH | 550 | 800 | 900 | 10 | Two-phase region | 120 |

TABLE 3-continued

| Specimen No. | Steel type | Coiling temperature of hot-rolled steel sheet (° C.) | Annealing temperature of hot-rolled steel sheet (° C.) | Annealing time of hot-rolled steel sheet (s) | Primary average heating rate (° C./s) | Primary maintaining temperature section (° C.) | Primary maintaining time (s) |
|---|---|---|---|---|---|---|---|
| 51 | XI | 450 | 850 | 1100 | 10 | Two-phase region | 120 |

TABLE 4

| Specimen No. | Steel type | Primary average cooling rate (° C./s) | Primary cooling stop temperature (° C.) | Secondary average cooling rate (° C./s) | Secondary maintaining temperature (° C.) | Secondary maintaining time (s) | Tertiary average cooling rate (° C./s) |
|---|---|---|---|---|---|---|---|
| 1 | A | 10 | 700 | 20 | 400 | 50 | 20 |
| 2 | A | Poor pickling | | | | | |
| 3 | A | Occurrence of fracture during cold rolling | | | | | |
| 4 | A | Poor pickling | | | | | |
| 5 | A | Occurrence of fracture during cold rolling | | | | | |
| 6 | A | 10 | 700 | 20 | 400 | 50 | 20 |
| 7 | A | 10 | 800 | 20 | 400 | 50 | 20 |
| 8 | A | 10 | 580 | 20 | 400 | 50 | 20 |
| 9 | A | 10 | 700 | 0.5 | 400 | 50 | 20 |
| 10 | B | 10 | 700 | 20 | 400 | 50 | 20 |
| 11 | C | 10 | 700 | 20 | 400 | 50 | 20 |
| 12 | C | 10 | 700 | 20 | 530 | 50 | 20 |
| 13 | C | 10 | 700 | 20 | 270 | 50 | 20 |
| 14 | C | 10 | 700 | 20 | 400 | 2 | 20 |
| 15 | C | 10 | 700 | 20 | 400 | 50 | 0.5 |
| 16 | C | 10 | 700 | 20 | 400 | 50 | 20 |
| 17 | C | 10 | 700 | 20 | 400 | 50 | 20 |
| 18 | C | 10 | 700 | 20 | 400 | 50 | 20 |
| 19 | C | 10 | 700 | 20 | 400 | 50 | 20 |
| 20 | C | 10 | 700 | 20 | 400 | 50 | 20 |
| 21 | D | 10 | 700 | 20 | 400 | 50 | 20 |
| 22 | E | 10 | 700 | 20 | 400 | 50 | 20 |
| 23 | F | 10 | 620 | 20 | 400 | 50 | 20 |
| 24 | G | 10 | 780 | 20 | 400 | 50 | 20 |
| 25 | H | 10 | 700 | 20 | 500 | 50 | 20 |
| 26 | I | 10 | 700 | 20 | 300 | 50 | 20 |

TABLE 5

| Specimen No. | Steel type | Primary average cooling rate (° C./s) | Primary cooling stop temperature (° C.) | Secondary average cooling rate (° C./s) | Secondary maintaining temperature (° C.) | Secondary maintaining time (s) | Tertiary average cooling rate (° C./s) |
|---|---|---|---|---|---|---|---|
| 27 | J | 10 | 700 | 20 | 400 | 50 | 20 |
| 28 | K | 10 | 700 | 20 | 400 | 50 | 20 |
| 29 | L | 10 | 700 | 20 | 400 | 50 | 20 |
| 30 | M | 10 | 700 | 20 | 400 | 50 | 20 |
| 31 | N | 10 | 700 | 20 | 400 | 50 | 20 |
| 32 | O | 10 | 700 | 20 | 400 | 50 | 20 |
| 33 | P | 10 | 700 | 20 | 400 | 50 | 20 |
| 34 | Q | 10 | 700 | 20 | 400 | 50 | 20 |
| 35 | R | 10 | 700 | 20 | 400 | 50 | 20 |
| 36 | S | 10 | 700 | 20 | 400 | 50 | 20 |
| 37 | T | 10 | 700 | 20 | 400 | 50 | 20 |
| 38 | U | 10 | 700 | 20 | 400 | 50 | 20 |
| 39 | V | 10 | 700 | 20 | 400 | 50 | 20 |
| 40 | W | 10 | 700 | 20 | 400 | 50 | 20 |
| 41 | X | 10 | 700 | 20 | 400 | 50 | 20 |
| 42 | Y | 10 | 700 | 20 | 400 | 50 | 20 |
| 43 | XA | 10 | 700 | 20 | 400 | 50 | 20 |
| 44 | XB | 10 | 700 | 20 | 400 | 50 | 20 |
| 45 | XC | 10 | 700 | 20 | 400 | 50 | 20 |

TABLE 5-continued

| Specimen No. | Steel type | Primary average cooling rate (° C./s) | Primary cooling stop temperature (° C.) | Secondary average cooling rate (° C./s) | Secondary maintaining temperature (° C.) | Secondary maintaining time (s) | Tertiary average cooling rate (° C./s) |
|---|---|---|---|---|---|---|---|
| 46 | XD | 10 | 700 | 20 | 400 | 50 | 20 |
| 47 | XE | 10 | 700 | 20 | 400 | 50 | 20 |
| 48 | XF | 10 | 700 | 20 | 400 | 50 | 20 |
| 49 | XG | 10 | 700 | 20 | 400 | 50 | 20 |
| 50 | XH | 10 | 700 | 20 | 400 | 50 | 20 |
| 51 | XI | 10 | 700 | 20 | 400 | 50 | 20 |

TABLE 6

| Specimen No. | Steel type | Secondary cooling stop temperature (° C.) | Secondary average heating rate (° C./s) | Tertiary maintaining temperature (° C.) | Tertiary maintaining time (s) | Quaternary average cooling rate (° C./s) |
|---|---|---|---|---|---|---|
| 1 | A | 220 | 15 | 400 | 320 | 10 |
| 2 | A | Poor pickling | | | | |
| 3 | A | Occurrence of fracture during cold rolling | | | | |
| 4 | A | Poor pickling | | | | |
| 5 | A | Occurrence of fracture during cold rolling | | | | |
| 6 | A | 180 | 15 | 400 | 320 | 10 |
| 7 | A | 210 | 15 | 400 | 320 | 10 |
| 8 | A | 200 | 15 | 400 | 320 | 10 |
| 9 | A | 190 | 15 | 400 | 320 | 10 |
| 10 | B | 190 | 15 | 400 | 320 | 10 |
| 11 | C | 200 | 15 | 400 | 320 | 10 |
| 12 | C | 220 | 15 | 400 | 320 | 10 |
| 13 | C | 200 | 15 | 400 | 320 | 10 |
| 14 | C | 180 | 15 | 400 | 320 | 10 |
| 15 | C | 180 | 15 | 400 | 320 | 10 |
| 16 | C | 330 | 15 | 400 | 320 | 10 |
| 17 | C | 70 | 15 | 400 | 320 | 10 |
| 18 | C | 200 | 15 | 530 | 320 | 10 |
| 19 | C | 220 | 15 | 270 | 320 | 10 |
| 20 | C | 210 | 15 | 400 | 40 | 10 |
| 21 | D | 210 | 15 | 400 | 320 | 10 |
| 22 | E | 190 | 15 | 400 | 320 | 10 |
| 23 | F | 180 | 15 | 400 | 320 | 10 |
| 24 | G | 200 | 15 | 400 | 320 | 10 |
| 25 | H | 280 | 15 | 400 | 320 | 10 |
| 26 | I | 120 | 15 | 400 | 320 | 10 |

TABLE 7

| Specimen No. | Steel type | Secondary cooling stop temperature (° C.) | Secondary average heating rate (° C. / s) | Tertiary maintaining temperature (° C.) | Tertiary maintaining time (s) | Quaternary average cooling rate (° C./s) |
|---|---|---|---|---|---|---|
| 27 | J | 190 | 15 | 400 | 320 | 10 |
| 28 | K | 190 | 15 | 400 | 320 | 10 |
| 29 | L | 210 | 15 | 400 | 320 | 10 |
| 30 | M | 200 | 15 | 400 | 320 | 10 |
| 31 | N | 220 | 15 | 400 | 320 | 10 |
| 32 | O | 180 | 15 | 400 | 320 | 10 |
| 33 | P | 200 | 15 | 400 | 320 | 10 |
| 34 | Q | 210 | 15 | 400 | 320 | 10 |
| 35 | R | 190 | 15 | 400 | 320 | 10 |
| 36 | S | 220 | 15 | 400 | 320 | 10 |
| 37 | T | 200 | 15 | 400 | 320 | 10 |
| 38 | U | 180 | 15 | 400 | 320 | 10 |
| 39 | V | 200 | 15 | 400 | 320 | 10 |
| 40 | W | 220 | 15 | 400 | 320 | 10 |
| 41 | X | 220 | 15 | 400 | 320 | 10 |

TABLE 7-continued

| Specimen No. | Steel type | Secondary cooling stop temperature (° C.) | Secondary average heating rate (° C./s) | Tertiary maintaining temperature (° C.) | Tertiary maintaining time (s) | Quaternary average cooling rate (° C./s) |
|---|---|---|---|---|---|---|
| 42 | Y | 180 | 15 | 400 | 320 | 10 |
| 43 | XA | 180 | 15 | 400 | 320 | 10 |
| 44 | XB | 200 | 15 | 400 | 320 | 10 |
| 45 | XC | 220 | 15 | 400 | 320 | 10 |
| 46 | XD | 190 | 15 | 400 | 320 | 10 |
| 47 | XE | 210 | 15 | 400 | 320 | 10 |
| 48 | XF | 180 | 15 | 400 | 320 | 10 |
| 49 | XG | 200 | 15 | 400 | 320 | 10 |
| 50 | XH | 210 | 15 | 400 | 320 | 10 |
| 51 | XI | 180 | 15 | 400 | 320 | 10 |

TABLE 8

| Specimen No. | Steel type | Ferrite (vol. %) | Bainite (vol. %) | Tempered martensite (vol. %) | Fresh martensite (vol. %) | Retained austenite (vol. %) | Perlite (vol. %) |
|---|---|---|---|---|---|---|---|
| 1 | A | 10 | 18 | 56 | 0 | 16 | 0 |
| 2 | A | Poor pickling | | | | | |
| 3 | A | Occurrence of fracture during cold rolling | | | | | |
| 4 | A | Poor pickling | | | | | |
| 5 | A | Occurrence of fracture during cold rolling | | | | | |
| 6 | A | 2 | 19 | 60 | 1 | 18 | 0 |
| 7 | A | 8 | 20 | 55 | 0 | 17 | 0 |
| 8 | A | 23 | 17 | 54 | 0 | 6 | 0 |
| 9 | A | 22 | 15 | 56 | 0 | 7 | 0 |
| 10 | B | 9 | 22 | 51 | 0 | 18 | 0 |
| 11 | C | 10 | 21 | 53 | 0 | 16 | 0 |
| 12 | C | 13 | 24 | 58 | 0 | 5 | 0 |
| 13 | C | 8 | 22 | 52 | 1 | 17 | 0 |
| 14 | C | 9 | 21 | 50 | 0 | 20 | 0 |
| 15 | C | 10 | 19 | 53 | 0 | 18 | 0 |
| 16 | C | 13 | 52 | 19 | 0 | 16 | 0 |
| 17 | C | 7 | 16 | 74 | 0 | 3 | 0 |
| 18 | C | 15 | 23 | 58 | 0 | 4 | 0 |
| 19 | C | 12 | 25 | 57 | 0 | 6 | 0 |
| 20 | C | 6 | 18 | 73 | 0 | 3 | 0 |
| 21 | D | 10 | 21 | 53 | 0 | 16 | 0 |
| 22 | E | 8 | 20 | 52 | 1 | 19 | 0 |
| 23 | F | 13 | 18 | 49 | 0 | 20 | 0 |
| 24 | G | 11 | 22 | 50 | 0 | 17 | 0 |
| 25 | H | 9 | 19 | 51 | 0 | 21 | 0 |
| 26 | I | 12 | 22 | 48 | 0 | 18 | 0 |

TABLE 9

| Specimen No. | Steel type | Ferrite (vol. %) | Bainite (vol. %) | Tempered martensite (vol. %) | Fresh martensite (vol. %) | Retained austenite (vol. %) | Perlite (vol. %) |
|---|---|---|---|---|---|---|---|
| 27 | J | 10 | 18 | 52 | 1 | 19 | 0 |
| 28 | K | 11 | 20 | 53 | 0 | 16 | 0 |
| 29 | L | 8 | 23 | 54 | 0 | 15 | 0 |
| 30 | M | 7 | 19 | 52 | 0 | 22 | 0 |
| 31 | N | 11 | 22 | 50 | 0 | 17 | 0 |
| 32 | O | 13 | 18 | 49 | 0 | 20 | 0 |
| 33 | P | 17 | 16 | 52 | 0 | 15 | 0 |
| 34 | Q | 12 | 22 | 49 | 1 | 16 | 0 |
| 35 | R | 9 | 28 | 45 | 0 | 18 | 0 |
| 36 | S | 8 | 22 | 48 | 1 | 21 | 0 |
| 37 | T | 6 | 17 | 41 | 0 | 36 | 0 |
| 38 | U | 5 | 38 | 42 | 0 | 15 | 0 |
| 39 | V | 13 | 20 | 51 | 0 | 16 | 0 |
| 40 | W | 10 | 24 | 47 | 0 | 19 | 0 |
| 41 | X | 8 | 23 | 52 | 0 | 17 | 0 |

TABLE 9-continued

| Specimen No. | Steel type | Ferrite (vol. %) | Bainite (vol. %) | Tempered martensite (vol. %) | Fresh martensite (vol. %) | Retained austenite (vol. %) | Perlite (vol. %) |
|---|---|---|---|---|---|---|---|
| 42 | Y | 9 | 19 | 51 | 1 | 20 | 0 |
| 43 | XA | 11 | 21 | 50 | 0 | 18 | 0 |
| 44 | XB | 8 | 13 | 15 | 20 | 44 | 0 |
| 45 | XC | 10 | 20 | 63 | 0 | 7 | 0 |
| 46 | XD | 8 | 18 | 42 | 17 | 15 | 0 |
| 47 | XE | 9 | 19 | 40 | 19 | 13 | 0 |
| 48 | XF | 7 | 16 | 62 | 0 | 5 | 9 |
| 49 | XG | 9 | 17 | 45 | 15 | 14 | 0 |
| 50 | XH | 10 | 21 | 40 | 16 | 13 | 0 |
| 51 | XI | 12 | 19 | 42 | 12 | 15 | 0 |

TABLE 10

| Specimen No. | Steel type | $[H]_F/[H]_{TM+B+\gamma}$ | $T(\gamma)/V(\gamma)$ | $B_{T\text{-}E}$ (MPa %) | $B_{T\text{-}H}$ (MPa$^2$%$^{1/2}$) | $B_R$ [R/t] |
|---|---|---|---|---|---|---|
| 1 | A | 0.69 | 0.26 | 30,523 | 11,964,552 | 2.04 |
| 2 | A | | | Poor pickling | | |
| 3 | A | | | Occurrence of fracture during cold rolling | | |
| 4 | A | | | Poor pickling | | |
| 5 | A | | | Occurrence of fracture during cold rolling | | |
| 6 | A | 0.24 | 0.17 | 28,015 | 5,860,157 | 2.20 |
| 7 | A | 0.57 | 0.28 | 31,276 | 10,723,162 | 1.68 |
| 8 | A | 0.94 | 0.25 | 21,148 | 7,935,401 | 2.43 |
| 9 | A | 0.92 | 0.19 | 20,504 | 8,021,845 | 2.39 |
| 10 | B | 0.71 | 0.22 | 31,630 | 11,104,682 | 1.86 |
| 11 | C | 0.68 | 0.27 | 30,255 | 10,658,017 | 2.02 |
| 12 | C | 0.92 | 0.06 | 19,649 | 8,034,113 | 4.38 |
| 13 | C | 0.70 | 0.08 | 26,007 | 7,964,520 | 3.72 |
| 14 | C | 0.65 | 0.05 | 24,629 | 7,509,473 | 3.58 |
| 15 | C | 0.69 | 0.09 | 25,481 | 8,106,522 | 3.36 |
| 16 | C | 0.71 | 0.06 | 20,374 | 7,658,831 | 2.54 |
| 17 | C | 0.93 | 0.07 | 21,227 | 8,564,300 | 4.20 |
| 18 | C | 0.94 | 0.06 | 19,630 | 8,109,624 | 3.84 |
| 19 | C | 0.92 | 0.08 | 20,337 | 7,355,204 | 3.69 |
| 20 | C | 0.93 | 0.05 | 21,844 | 8,257,569 | 6.37 |
| 21 | D | 0.69 | 0.23 | 28,015 | 11,063,348 | 1.85 |
| 22 | E | 0.64 | 0.28 | 31,270 | 10,567,203 | 2.20 |
| 23 | F | 0.72 | 0.25 | 30,408 | 9,085,446 | 1.94 |
| 24 | G | 0.66 | 0.17 | 31,954 | 11,320,098 | 2.05 |
| 25 | H | 0.87 | 0.19 | 30,728 | 10,841,682 | 2.33 |
| 26 | I | 0.44 | 0.21 | 32,550 | 9,026,274 | 1.74 |

TABLE 11

| Specimen No. | Steel type | $[H]_F/[H]_{TM+B+\gamma}$ | $T(\gamma)/V(\gamma)$ | $B_{T\text{-}E}$ (MPa %) | $B_{T\text{-}H}$ (MPa$^2$%$^{1/2}$) | $B_R$ [R/t] |
|---|---|---|---|---|---|---|
| 27 | J | 0.73 | 0.18 | 31,378 | 10,367,206 | 2.16 |
| 28 | K | 0.75 | 0.15 | 30,164 | 9,141,375 | 2.11 |
| 29 | L | 0.68 | 0.23 | 28,308 | 11,892,299 | 1.83 |
| 30 | M | 0.64 | 0.27 | 31,115 | 10,058,266 | 1.57 |
| 31 | N | 0.70 | 0.25 | 30,422 | 12,856,305 | 1.70 |
| 32 | O | 0.62 | 0.21 | 29,380 | 10,199,280 | 2.35 |
| 33 | P | 0.67 | 0.17 | 31,924 | 11,353,088 | 2.28 |
| 34 | Q | 0.69 | 0.19 | 30,267 | 9,534,657 | 1.92 |
| 35 | R | 0.73 | 0.22 | 32,640 | 10,662,004 | 1.63 |
| 36 | S | 0.71 | 0.28 | 28,935 | 12,324,290 | 2.13 |
| 37 | T | 0.75 | 0.16 | 29,613 | 11,821,608 | 2.01 |
| 38 | U | 0.67 | 0.19 | 31,336 | 10,370,558 | 1.53 |
| 39 | V | 0.55 | 0.24 | 30,165 | 9,208,094 | 1.61 |
| 40 | W | 0.59 | 0.27 | 28,965 | 10,334,617 | 2.52 |
| 41 | X | 0.66 | 0.26 | 32,257 | 12,496,455 | 1.87 |
| 42 | Y | 0.63 | 0.23 | 31,104 | 9,100,524 | 2.06 |
| 43 | XA | 0.58 | 0.18 | 19,050 | 6,205,394 | 2.65 |
| 44 | XB | 0.69 | 0.23 | 20,346 | 5,847,279 | 5.07 |
| 45 | XC | 0.93 | 0.17 | 16,205 | 7,680,257 | 4.69 |

TABLE 11-continued

| Specimen No. | Steel type | $[H]_F/[H]_{TM+B+\gamma}$ | $T(\gamma)/V(\gamma)$ | $B_{T \cdot E}$ (MPa %) | $B_{T \cdot H}$ (MPa²%$^{1/2}$) | $B_R$ [R/t] |
|---|---|---|---|---|---|---|
| 46 | XD | 0.72 | 0.19 | 26,891 | 8,005,138 | 5.11 |
| 47 | XE | 0.68 | 0.15 | 27,356 | 8,930,261 | 6.28 |
| 48 | XF | 0.94 | 0.24 | 18,480 | 7,724,050 | 2.49 |
| 49 | XG | 0.75 | 0.20 | 25,260 | 7,358,320 | 5.38 |
| 50 | XH | 0.80 | 0.16 | 27,973 | 9,302,115 | 6.01 |
| 51 | XI | 0.71 | 0.19 | 26,104 | 10,254,291 | 4.36 |

As shown in Tables 1 to 11 above, it could be seen that the specimens satisfying the conditions presented in the present invention simultaneously provide superior strength and workability since the value of $[H]_F/[H]_{TM+B+\gamma}$ satisfies the range of 0.4 to 0.9, the value of $T(\gamma)/V(\gamma)$ satisfies 0.1 or more, the balance (TSXEl) of tensile strength and elongation is 22,000 MPa % or more, the balance (TS²XHER$^{1/2}$) of tensile strength and hole expansion ratio is 7*10⁶ (MPa²%$^{1/2}$) or more, and the bendability (R/t) satisfies the range of 0.5 to 3.0.

It could be seen that, in specimens 2 to 5, since the alloy composition range of the present invention overlaps, but the hot-rolled annealing temperature and time are outside the range of the present invention, the pickling failure occurs or the fracture occurs during the cold rolling.

In specimen 6, the amount of ferrite formed was insufficient because the primary heating or maintaining temperature in the annealing heat treatment process after the cold rolling exceeded the range limited by the present invention. As a result, it could be seen that, in specimen 6, $[H]_F/[H]_{TM+B+\gamma}$ is less than 0.4, and the balance of tensile strength and hole expansion ratio (TS²XHER$^{1/2}$) is less than 7*10⁶ (MPa²%$^{1/2}$).

In specimen 8, the primary cooling stop temperature in the annealing heat treatment process after the cold rolling is low, so ferrite was excessively formed and retained austenite was formed less. As a result, it could be seen that, in specimen 8, $[H]_F/[H]_{TM+B+\gamma}$ exceeds 0.9, and the balance (TSXEl) of tensile strength and elongation is less than 22,000 MPa %.

In Specimen 9, the average cooling rate of the secondary cooling was low, so the ferrite was excessively formed and the retained austenite was formed less. As a result, it could be seen that, in specimen 9, $[H]_F/[H]_{TM+B+\gamma}$ exceeds 0.9, and the balance (TSXEl) of tensile strength and elongation is less than 22,000 MPa %.

In specimen 12, the secondary maintaining temperature was high, so the retained austenite was formed less. As a result, it could be seen that, in specimen 12, $[H]_F/[H]_{TM+B+\gamma}$ exceeds 0.9, $T(\gamma)/V(\gamma)$ is less than 0.1, the balance (TSXEl) of tensile strength and elongation is less than 22,000 MPa %, and the bendability (R/t) exceeds 3.0.

It could be seen that, in specimen 13, the secondary maintaining temperature is low, so $T(\gamma)/V(\gamma)$ is less than 0.1 and the bendability (R/t) exceeds 3.0, and in specimen 14, the secondary maintaining time is short, so $T(\gamma)/V(\gamma)$ is less than 0.1 and the bendability (R/t) exceeds 3.0. It can be seen that $T(\gamma)/V(\gamma)$ is less than 0.1 and the bendability (R/t) exceeds 3.0.

It could be seen that, in specimen 15, the average cooling rate of the tertiary cooling is low, so $T(\gamma)/V(\gamma)$ is less than 0.1 and the bendability (R/t) exceeds 3.0.

In Specimen 16, the secondary cooling stop temperature was high, so the bainite was excessively formed and the tempered martensite was formed less. As a result, it could be seen that, in specimen 16, $T(\gamma)/V(\gamma)$ is less than 0.1, and the balance (TSXEl) of tensile strength and elongation is less than 22,000 MPa %.

In specimen 17, the secondary cooling stop temperature was low, so the tempered martensite was excessively formed and the retained austenite was formed less. As a result, it could be seen that, in specimen 17, $[H]_F/[H]_{TM+B+\gamma}$ exceeds 0.9, $T(\gamma)/V(\gamma)$ is less than 0.1, the balance (TSXEl) of tensile strength and elongation is less than 22,000 MPa %, and the bendability (R/t) exceeds 3.0.

In specimen 18, the tertiary maintaining temperature was high, so the retained austenite was formed less. As a result, it could be seen that, in specimen 18, $[H]_F/[H]_{TM+B+\gamma}$ exceeds 0.9, $T(\gamma)/V(\gamma)$ is less than 0.1, the balance (TSXEl) of tensile strength and elongation is less than 22,000 MPa %, and the bendability (R/t) exceeds 3.0.

In specimen 19, the quaternary maintaining temperature was low, so the retained austenite was formed less. As a result, it could be seen that, in specimen 19, $[H]_F/[H]_{TM+B+\gamma}$ exceeds 0.9, $T(\gamma)/V(\gamma)$ is less than 0.1, the balance (TSXEl) of tensile strength and elongation is less than 22,000 MPa %, and the bendability (R/t) exceeds 3.0.

In specimen 20, the tertiary maintaining time was short, so the tempered martensite was excessively formed and the retained austenite was formed less. As a result, it could be seen that, in specimen 20, $[H]_F/[H]_{TM+B+\gamma}$ exceeds 0.9, $T(\gamma)/V(\gamma)$ is less than 0.1, the balance (TSXEl) of tensile strength and elongation is less than 22,000 MPa %, and the bendability (R/t) exceeds 3.0.

Specimens 43 to 51 may satisfy the manufacturing conditions presented in the present invention, but may be outside the alloy composition range. In these cases, it could be seen that the condition of the $[H]_F/[H]_{TM+B+\gamma}$, the condition of $T(\gamma)/V(\gamma)$, the condition of the balance (TSXEl) of tensile strength and elongation, the condition of the balance (TS²XHER$^{1/2}$) of tensile strength and hole expansion ratio, and the condition of bendability (R/t) of the present invention are not all satisfied. Meanwhile, it could be seen that, in specimen 45, when the total content of aluminum (Al) and silicon (Si) is less than 1.0%, the conditions of $[H]_F/[H]_{TM+B+\gamma}$, the balance (TSXEl) of tensile strength and elongation, and the bendability (R/t) are not satisfied.

While the present invention has been described in detail through exemplary embodiment, other types of exemplary embodiments are also possible. Therefore, the technical spirit and scope of the claims set forth below are not limited to exemplary embodiments.

The invention claimed is:
1. A high strength steel sheet having superior workability, comprising:
by wt %, C: 0.25 to 0.75%, Si: 4.0% or less, Mn: 0.9 to 5.0%, Al: 5.0% or less, P: 0.15% or less, S: 0.03% or less, N: 0.03% or less, a balance of Fe, and unavoidable impurities; and as microstructures, ferrite which is a soft structure, and tempered martensite, bainite, and retained austenite which are hard structures, wherein the high strength steel sheet satisfies the following [Relational Expression 1] and [Relational Expression 2]

$$0.4 \leq [H]_F/[H]_{TM+B+\gamma} \leq 0.9 \quad \text{[Relational Expression 1]}$$

where $[H]_F$ and $[H]_{TM+B+\gamma}$ are nanohardness values measured using a nanoindenter, $[H]_F$ is an average nanohardness value Hv of the ferrite which is the soft structure, $[H]_{TM+B+\gamma}$ is the average nanohardness value Hv of the tempered martensite, the bainite, and the retained austenite which are the hard structures $$T(\gamma)/V(\gamma) \geq 0.1 \quad \text{[Relational Expression 2]}$$

where $T(\gamma)$ is a fraction, in vol %, of the tempered retained austenite of the steel sheet, and $V(\gamma)$ is a fraction, in vol %, of the retained austenite of the steel sheet.

2. The high strength steel sheet of claim 1, further comprising:
   any one or more of the following (1) to (9):
   (1) one or more of Ti: 0 to 0.5%, Nb: 0 to 0.5%, and V: 0 to 0.5%;
   (2) one or more of Cr: 0 to 3.0% and Mo: 0 to 3.0%;
   (3) one or more of Cu: 0 to 4.5% and Ni: 0 to 4.5%;
   (4) B: 0 to 0.005%;
   (5) one or more of Ca: 0 to 0.05%, REM: 0 to 0.05% excluding Y, and Mg: 0 to 0.05%;
   (6) one or more of W: 0 to 0.5% and Zr: 0 to 0.5%;
   (7) one or more of Sb: 0 to 0.5% and Sn: 0 to 0.5%;
   (8) one or more of Y: 0 to 0.2% and Hf: 0 to 0.2%; and
   (9) Co: 0 to 1.5%.

3. The high strength steel sheet of claim 1, wherein a total content (Si+Al) of Si and Al is 1.0 to 6.0 wt %.

4. The high strength steel sheet of claim 1, wherein the microstructure of the steel sheet includes 30 to 70 vol % of tempered martensite, 10 to 45 vol % of bainite, 10 to 40 vol % of retained austenite, and 3 to 20 vol % of ferrite.

5. The high strength steel sheet of claim 1, wherein a balance $B_{T \cdot E}$ of tensile strength and elongation expressed by the following [Relational Expression 3] is 22,000 MPa % or more, a balance $B_{T \cdot H}$ of tensile strength and hole expansion ratio expressed by the following [Relational Expression 4] is $7*10^6$ MPa$^2$%$^{1/2}$ or more, and bending formability $B_R$ expressed by the following [Relational Expression 5] is 0.5 to 3.0

$$B_{T \cdot E} = [\text{Tensile Strength(TS,MPa)}]*[\text{Elongation(El,\%)}] \quad \text{[Relational Expression 3]}$$

$$B_{T \cdot H} = [\text{Tensile Strength(TS,MPa)}]^2*[\text{Hole Expansion Ratio(HER,\%)}]^{1/2} \quad \text{[Relational Expression 4]}$$

$$B_R = R/t \quad \text{[Relational Expression 5]}$$

where R means a minimum bending radius, in mm, at which cracks do not occur after a 90° bending test, and t means a thickness, in mm, of the steel sheet.

\* \* \* \* \*